United States Patent [19]

Suzuki et al.

[11] Patent Number: 4,698,691
[45] Date of Patent: Oct. 6, 1987

[54] HALFTONE IMAGE PROCESSING METHOD

[75] Inventors: Koichi Suzuki, Yokohama; Noboru Murayama, Tokyo; Masahiro Ito, Kawasaki; Kei Sato, Yokohama, all of Japan

[73] Assignee: Ricoh Company, Ltd., Tokyo, Japan

[21] Appl. No.: 674,870

[22] Filed: Nov. 26, 1984

[30] Foreign Application Priority Data

Nov. 24, 1983 [JP] Japan ............................. 58-221247

[51] Int. Cl.$^4$ ............................................. H04N 1/40
[52] U.S. Cl. .................................................. 358/283
[58] Field of Search .................. 358/75, 78, 80, 283, 358/284

[56] References Cited

U.S. PATENT DOCUMENTS

| | | | |
|---|---|---|---|
| 4,081,828 | 3/1978 | Jones et al. | 358/75 |
| 4,302,770 | 11/1981 | Hubbard, Jr. et al. | 358/75 |
| 4,350,996 | 9/1982 | Rosenfeld | 358/75 |
| 4,375,649 | 3/1983 | Mir et al. | 358/75 |
| 4,463,374 | 7/1984 | Thompson | 358/75 |
| 4,537,470 | 8/1985 | Schoppmeyer | 358/75 |
| 4,547,812 | 10/1985 | Waller et al. | 358/283 |
| 4,553,165 | 11/1985 | Bayer | 358/284 |
| 4,553,172 | 11/1985 | Yamada et al. | 358/283 |

Primary Examiner—Edward L. Coles, Sr.
Attorney, Agent, or Firm—Oblon, Fisher, Spivak, McClelland & Maier

[57] ABSTRACT

A halftone image processing method for providing image information in a bit distribution by specifying a matrix pattern in response to tone data which is indicative of a recording density. Several matrix pattern groups are prepared each comprising matrix patterns which are larger in number than dots which define a dot matrix. The matrix pattern groups are provided with density characteristics different from each other. One of the groups is specified in conformity to a required density characteristic, while one of the matrix patterns in the specified group is specified in response to tone data. Any one of various modes of tone representation is selectable and, in addition, numerous tones may be rendered to enhance smooth representation of tones.

15 Claims, 30 Drawing Figures

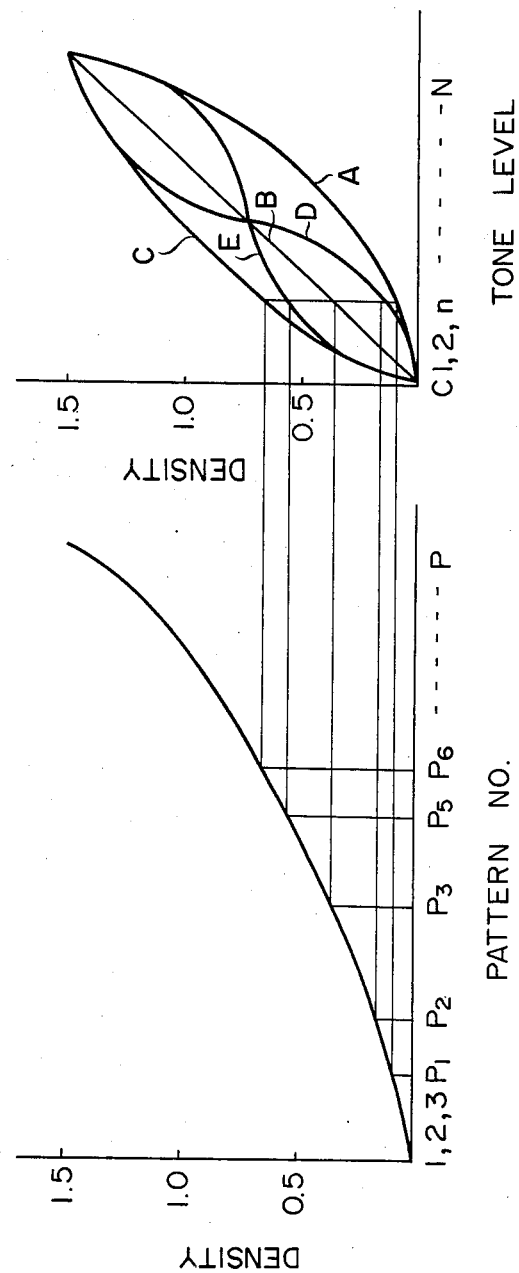

FIG. 2

| PATTERN NO. | LEADING ADDRESS | CHARACTER-ISTIC A | CHARACTER-ISTIC B | CHARACTER-ISTIC C | CHARACTER-ISTIC D | CHARACTER-ISTIC E |
|---|---|---|---|---|---|---|
| 1 | X000H | O | O |  | O | O |
| 2 | X008H | O |  |  | O |  |
| 3 | X010H | O |  |  |  |  |
| 4 | X018H |  |  |  | O |  |
| 5 | X020H |  |  |  |  |  |
| 6 | X028H |  | O |  |  |  |
| 7 | X030H |  | O |  |  |  |
| 8 | X038H |  |  |  |  |  |
| 9 | X040H |  |  | O |  | O |
| 10 |  |  |  |  |  |  |
| 63 | X3F0H | O | O | O | O |  |
| 64 | X3F8H |  | O | O | O | O |

FIG.3A

| TONE LEVEL | LEADING ADDRESS |
|---|---|
| 0 | X000H |
| 1 | X008H |
| 2 | X010H |
| ---- | ---- |
| 16 | X3F8H |

FIG.3B

| TONE LEVEL | LEADING ADDRESS |
|---|---|
| 0 | X000H |
| 1 | X028H |
| 2 | X038H |
| ---- | ---- |
| 16 | X3F8H |

FIG.3C

| TONE LEVEL |
|---|
| 0 |
| 1 |
| 2 |
| ---- |
| 16 |

FIG. 4A

| 58 | 53 | 39 | 28 | 27 | 42 | 54 | 59 |
|---|---|---|---|---|---|---|---|
| 48 | 40 | 21 | 14 | 13 | 20 | 41 | 49 |
| 34 | 22 | 10 | 4 | 3 | 9 | 19 | 35 |
| 29 | 15 | 5 | 1 | 2 | 8 | 18 | 32 |
| 38 | 23 | 11 | 6 | 7 | 12 | 26 | 37 |
| 52 | 45 | 24 | 16 | 17 | 25 | 44 | 51 |
| 62 | 56 | 46 | 30 | 31 | 43 | 55 | 61 |
| 63 | 57 | 47 | 33 | 36 | 50 | 60 | 63 |

SOURCE MOTHER PATTERN 1

FIG. 4B

| 14 | 24 | 52 | 55 | 53 | 46 | 22 | 12 |
|---|---|---|---|---|---|---|---|
| 34 | 50 | 41 | 27 | 25 | 39 | 48 | 32 |
| 60 | 43 | 19 | 7 | 5 | 17 | 37 | 62 |
| 57 | 29 | 9 | 1 | 3 | 15 | 35 | 63 |
| 54 | 45 | 21 | 11 | 13 | 23 | 51 | 56 |
| 26 | 40 | 47 | 31 | 33 | 49 | 42 | 28 |
| 6 | 18 | 38 | 59 | 61 | 44 | 20 | 8 |
| 4 | 16 | 36 | 63 | 58 | 30 | 10 | 2 |

SOURCE MOTHER PATTERN 2

FIG. 4C

| 38 | 13 | 9 | 44 | 40 | 15 | 12 | 42 |
|---|---|---|---|---|---|---|---|
| 17 | 1 | 5 | 29 | 19 | 3 | 7 | 31 |
| 55 | 21 | 25 | 49 | 53 | 23 | 27 | 51 |
| 59 | 35 | 45 | 61 | 57 | 33 | 47 | 63 |
| 39 | 16 | 11 | 41 | 37 | 14 | 10 | 43 |
| 20 | 4 | 8 | 32 | 18 | 2 | 6 | 30 |
| 54 | 24 | 28 | 52 | 56 | 22 | 26 | 50 |
| 58 | 34 | 48 | 63 | 60 | 36 | 46 | 62 |

SOURCE MOTHER PATTERN 3

FIG. 4D

| 54 | 25 | 17 | 48 | 56 | 27 | 19 | 46 |
|---|---|---|---|---|---|---|---|
| 33 | 1 | 9 | 57 | 35 | 3 | 11 | 59 |
| 23 | 41 | 49 | 29 | 21 | 43 | 51 | 31 |
| 15 | 63 | 37 | 5 | 13 | 61 | 39 | 7 |
| 55 | 28 | 20 | 45 | 53 | 26 | 18 | 47 |
| 36 | 4 | 12 | 60 | 34 | 12 | 10 | 58 |
| 22 | 44 | 52 | 32 | 24 | 42 | 50 | 30 |
| 14 | 62 | 40 | 8 | 16 | 63 | 38 | 6 |

SOURCE MOTHER PATTERN 4

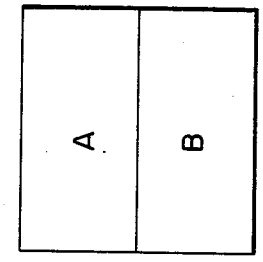
FIG.6A BISECTING IN MAIN SCAN DIRECTION
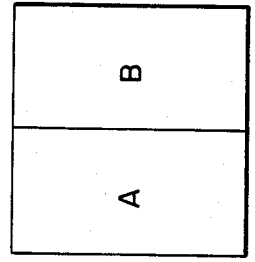
FIG.6B BISECTING IN SUBSCAN DIRECTION
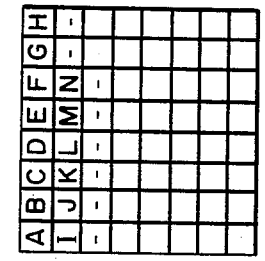
FIG.6E DIVIDING INTO 64 (IN BITS)
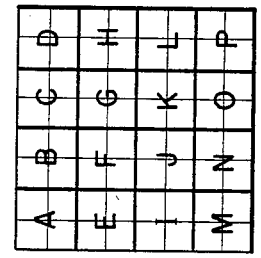
FIG.6D DIVIDING INTO 16
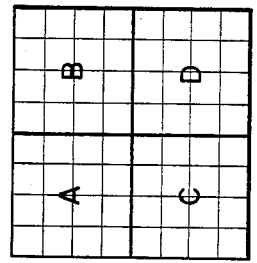
FIG.6C QUARTERING

FIG. 7A

1ST MASK PATTERN (1 BYTE) FOR A & C EXTRACTION — F0H

2ND MASK PATTERN (1 BYTE) FOR B & D EXTRACTION — 0FH

FIG. 7B

1ST MASK PATTERN (1 BYTE) FOR A, E, I & M EXTRACTION — C0H

2ND MASK PATTERN (1 BYTE) FOR B, F, J & N EXTRACTION — 30H

3RD MASK PATTERN (1 BYTE) FOR C, G, K & O EXTRACTION — 0CH

4TH MASK PATTERN (1 BYTE) FOR D, H, L & P EXTRACTION — 03H

| FIG.8A | FIG.8B |

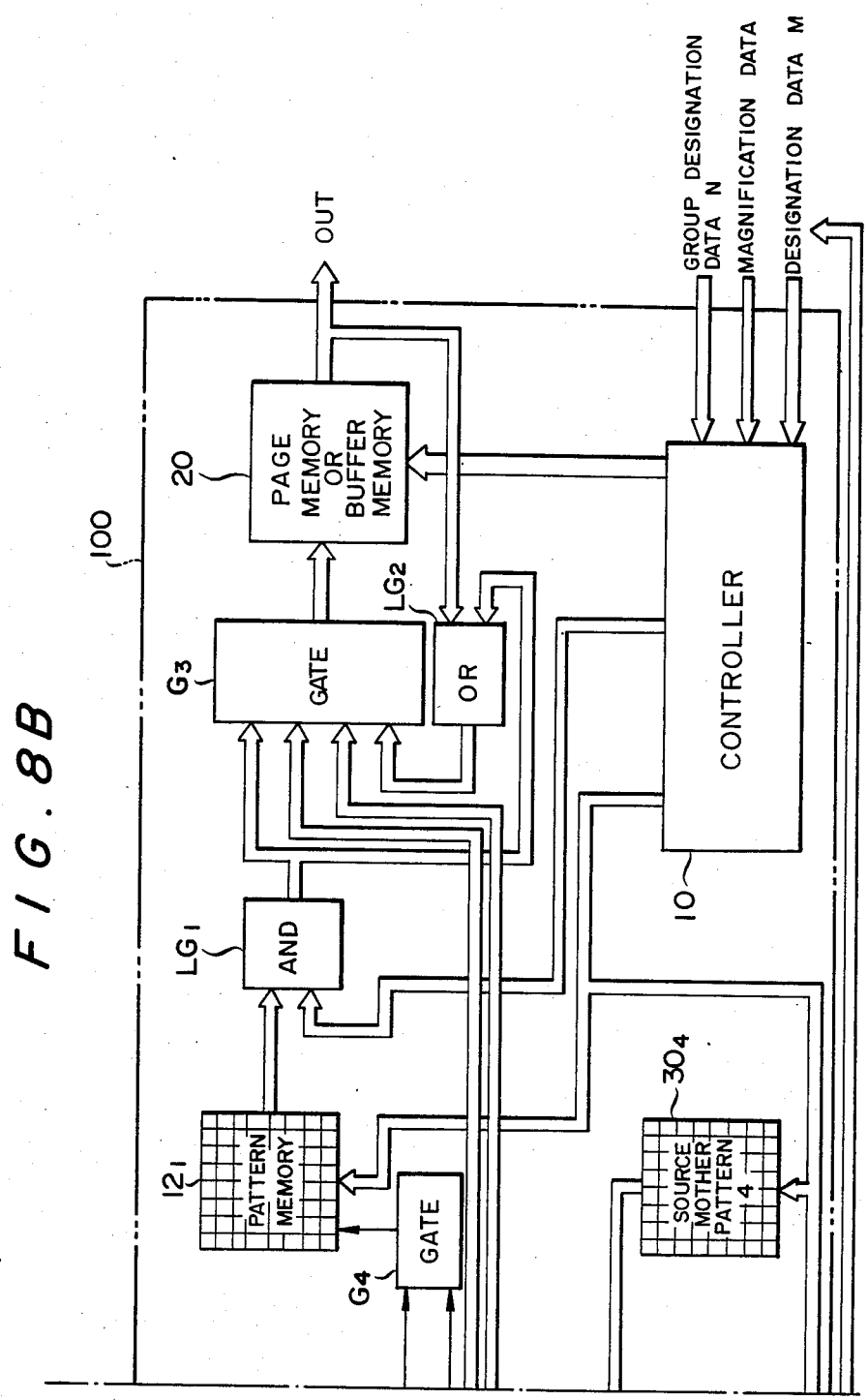

FIG. 10A

PATTERN 1

M = DIVISION INTO 4

| 12 | 14 | 16 | 18 | 19 |
|----|----|----|----|----|
| 17 | 19 | 21 | 20 |    |
| 22 | 24 | 21 |    |    |
| 27 | 22 |    |    |    |

FIG. 10B

PATTERN 4

M = DIVISION INTO 16

| 12 | 14 | 16 | 18 | 19 |
|----|----|----|----|----|
| 17 | 19 | 21 | 20 | 24 |
| 22 | 24 | 21 | 25 | 26 |
| 27 | 22 | 26 | 27 |    |
| 23 | 27 |    |    |    |

FIG. 11A

PATTERN 1

M = DIVISION INTO 4

| A OF 12 | B OF 14 | A OF 16 | B OF 18 | A OF 19 |
|---------|---------|---------|---------|---------|
| C OF 17 | D OF 19 | C OF 21 | D OF 20 |         |
| A OF 22 | B OF 24 | A OF 21 |         |         |
| C OF 27 | D OF 22 |         |         |         |

1 DOT

AREA TO BE RECORDED BY 1 TONE DATA

FIG. 11B

PATTERN 4

M = DIVISION INTO 16

| A OF 12 | B OF 14 | C OF 16 | D OF 18 | A OF 19 | | | |
|---|---|---|---|---|---|---|---|
| E OF 17 | F OF 19 | G OF 21 | H OF 20 | E OF 24 | | | |
| I OF 22 | J OF 24 | K OF 21 | L OF 25 | I OF 26 | | | |
| M OF 27 | N OF 22 | O OF 26 | P OF 27 | | | | |
| A OF 23 | B OF 27 | | | | | | |
| | | | | | | | |
| | | | | | | | |
| | | | | | | | |
| | | | | | | | |

AREA TO BE RECORDED BY 1 TONE DATA

1 DOT

PATTERN 4
M = DIVISION INTO 16

PATTERN 1
M = DIVISION INTO 4

A of 12 | B of 14
C of 17 | D of 19

HALFTONE IMAGE PROCESSING METHOD

BACKGROUND OF THE INVENTION

The present invention relates to an improvement in an image information processing method for processing hafltone images in photographs, pictures and the like and, more particularly, to a tone information processing method for providing bit distribution pattern data representative of a halftone image from tone data.

Prior art tone information processing methods include a fixed density pattern type method which uses a plurality of halftone matrix patterns each comprising a predetermined number of bits and having record (display) information bits distributed in a predetermined mode. One of the matrix patterns associated with a particular density indicated by tone data is specified (selected) and, then, its bit information is developed in a page memory or a buffer memory while being matched to recording (displaying) positions of the tone data. The problem with this method is that since a density usually has correspondence with a number of pixels (bits) in a matrix, an increase in the number of tones to be rendered causes the matrix itself to become large-sized. Such is reflected by a decrease in resolution because one matrix is extracted by one tone data. While a smaller matrix is successful to enhance the resolution, it gives rise to another problem that the number of available tones is reduced to in turn lower the smoothness in halftone representation.

To overcome the above problem, there has been proposed a method which provides image information by changing the size of a matrix depending upon the roughness of an image (e.g. Japanese Patent Laid-Open Publication No. 57-159173/1982). This approach is impractical, however, in view of the required precision and difficulty in identifying a roughness of an image and the need for numerous kinds of different matrices and, therefore, a considerable amount of data fixedly stored memories.

In accordance with another prior art method, a plurality of (four) different kinds of small matrix patterns (4 pixels:five tones) are combined to define one large matrix (4 kinds×4 pixels=16 pixels:4 kinds×5 tones=20 tones) (e.g. Japanese Patent Laid-Open Publication No. 57-159174/1982). The small matrix patterns are fixed in position within the large matrix pattern kind by kind. Tone data are allocated to specific ones of the submatrix patterns based on their order of arrangement in an image, thereby producing image information on a small matrix pattern basis. Such a method provides image information in one large matrix pattern as composite information of a plurality of (four) small matrix patterns. Stated another way, one large matrix pattern is specified by a plurality of (four) tone data.

However, the small and large matrix patterns scheme discussed above simply results in the fact that a plurality of (four) kinds of small matrix patterns each determine image information associated with a large matrix, that is, a plurality of (four) tone data determine a large matrix pattern. In effect, the resolution and the smoothness of gradation are dependent upon the small matrix patterns, the large matrix little contributing to an improvement in smoothness of gradation. Specifically, since a small matrix pattern of one kind appears at a predetermined interval (every two small matrix patterns), an irregular or regular pattern develops in a reproduced image as has been pointed out as a drawback of a dither method. In addition, the smoothness of gradation achievable with the large matrix pattern is limited because the matrix resembles a matrix pattern in accordance with the prior art dither method in which a plurality of regions are regarded as a single division.

Meanwhile, it has been proposed to utilize a plurality of groups of matrix patterns having different density characteristics in order to record halftone images with different density characteristics. Such an approach is not fully acceptable, however, because the attainable number of tones in each group is not more than the number of dots which are included in a single matrix pattern. That is, even if groups with several different characteristics are employed, they fail to set up sufficiently smooth gradation or delicate density characteristics.

SUMMARY OF THE INVENTION

It is therefore an object of the present invention to provide a halftone image processing method which allows several kinds of tone representation with smooth gradation and different density characteristics to be selectively used.

It is another object of the present invention to provide a generally improved halftone image processing method.

In order to achieve the above objects, the present invention uses several matrix pattern groups having different density characteristics. Each of the matrix pattern groups comprises a certain number of matrix patterns which is larger in number than dots contained in a single matrix pattern. Particular one of the matrix pattern groups is specified in conformity to a required density characteristic, while particular one of the matrix patterns in the selected group is specified in response to tone data.

For matrix pattern groups each comprising matrix patterns larger in number than dots which define a matrix pattern, a reference may be made to Japanese Patent Applications Nos. 58-132187/1983, 58-138944/1983 and 58-161692, for example.

In the first and second Japanese Patent Applications cited above, each of the dots (round) assigned to one pixel (squre) has a larger area than one pixel so that dots in nearby pixels may overlap each other. In addition, although the number of recording pixels in one pattern is constant, different tones are assigned to longitudinal and transverse dot distributions and the diagonal dot distribution because the former entails overlapping of recording dots or of erasing dots but the latter does not, thereby increasing the number of tones which can be rendered. The matrix pattern specified by tone data is the same in size as an image pattern to be extracted allocated to the tone data. Such insures tones far larger in number than the dots assigned to a single patern and, therefore, smooth reprenation of gradation.

As to the method disclosed in the third-mentioned Japanese Patent Application, a mother matrix pattern which is a large matrix pattern is specified by tone data, while information is extracted from a child matrix pattern, part of the mother matrix pattern, to produce image information allocating the extracted information to the tone data. The extracted image pattern allocated to the tone data is different in size from the matrix pattern specified by the tone data. This kind of method offers a higher resolution because the tone pattern is updated on a child matrix pattern basis, resulting in high reproducibility of edges such as contours of photograhic mages and graphic images. Concerning a contour of a picture, for example, a child matrix pattern associated therewith forms part of a high density mother matrix pattern so that the contour appears clearcut, while in a low density area outside the contour a child matrix pattern associated therewith forms part of a low density mother matrix pattern to reproduce a low ensity image, thereby emphasizing the contrast. Although variation derived from such a method is rather monotonous because tone data specifies a large matrix mattern, the smoothness in an area where the tone changes littel by little is considerable.

In accordance with the present invention, a plurality of matrix pattern groups which offer smooth gradation as described above are used and are provided with density characteristics which differ from each other. A certain matrix pattern in a certain matrix pattern group is specified by group designation and tone data so as to extract all or part of image data in the specific pattern. Such allows an image to be reproduced with smooth gradation and a desired density characteristic.

In a preferred embodiment of the present invention, for more adequate selection of a kind of tone representation and a density characteristic, matrix patterns are rewritable by means of a command from a host machine and a matrix pattern group designated by the host machine is specified. This allows tone representation and density characteristic to be adjusted, changed and set with relatively great freedom from outside a halftone image processing apparatus for practicing the present invention, thereby widening the applicable range of the apparatus.

Assume that where patterns with different densities are arranged in the order of uniformly increasing density and designated by pattern numbers (Nos.), a pattern-to-density relationship is set up as shown in FIG. 1A. Further, assume that each of such patterns belongs to any one of five different pattern groups A–E which are different in density characteristic. Then, almost all the possible tone representation characteristics will generally be realized only if the tone levels (tone data) of each group are related with densities as represented by a tendency of FIG. 1B. The characteristics are as follows:

Group A: The density changes only insignificantly in a low density range and become more significant as the density shifts to a higher range;

Group B: The density changes uniformly or linearly in the whole density range;

Group C: The density changes significantly in a low density range with the change suppressed in a high range;

Group D: The density changes only insignificantly in low and high density ranges and significantly in a medium range; and Group E: The density changes significantly in low and high density ranges and only insignificantly in a medium range.

In a preferred embodiment of the present invention, matrix pattern groups are limited to the five stated above.

In the case where a plurality of groups of matrix patterns are used, all the patterns are stored in a memory as bit images in the order of the pattern No. assigned thereto. Although data representative of each pattern amounts to a plurality of bytes, it can readily be read out if the leading address (in bytes) is known. For example, as shown in FIG. 2, leading addresses may be assinged to the patterns in all the groups so that any of the patterns may be specified using the leading address. In FIG. 2, mark "O" in the columns of characteristics A–E shows that the pattern Nos. so marked belong to the characteristic groups funished with those characteristics. In this particular example, concerning those patterns which commonly belong to a plurality of groups, only one of them is stored; even if each group includes seventeen (0–16) patterns, for example, the total number of patterns may be reduced to sixty-four, for example, because common patterns are reduced to one. With this principle, it is possible to specify a pattern unconditionally by tone data (1–64) but impossible to select a density characteristic. Hence, a leading address (associated with a pattern No.) is specified by group (A–E) designation data and tone data (0–16).

Alternatively, as shown in FIGS. 3A-3C, pattern tables each assigning leading addresses to the tone levels (0–16) may be used for the respective characteristic (groups). Although such would increase the number of stored patterns, extraction of a pattern matching with a specified characteristic (group) is facilitated because one of the tables will be specified by group designation data and one of the patterns in the selected table by tone data.

The above and other objects, features and advantages of the present invention will become more apparent from the following detailed description taken with the accompanying drawings.

BRIEF DESCRIPTION OF THE DRAWINGS

FIG. 1A is a graph showing a relationship beween matrix patterns arranged in the order of density to be rendered thereby and densities reproduced by the matrix patterns;

FIG. 1B is a graph showing a relationship between tone levels to which several groups of matrix patterns are assigned and densities to be represented, i.e. density characteristics;

FIGS. 3A-3C are plan views showing relationships between tone levels and memory leading addresses assigned to matrix patterns representative of the tone levels, which respectively are associated with groups having different density characteristics;

FIGS. 4A-4D are plan views of source mother matrix patterns for generating mother matrix patterns and each storing threshold data;

FIGS. 6A-6E are plan views of child matrix patterns which are designated by capital letters to show their positions in a mother matrix pattern;

FIGS. 7A and 7B are plan views of mask patterns in which hatched portions represent extraction command data, logical ONE, and blank portions non-extraction command data, logical ZERO;

FIGS. 8A-8B is a schematic block diagram of an exemplary apparatus for practicing the method of the present invention;

FIGS. 9A-1, 9A-2 and 9B are flowcharts demonstrating a tone data processing operation of a computer which implements a central control unit 10 shown in FIG. 8 and a CPU board 10 shown in FIG. 13;

FIGS. 10A and 10B are plan views showing distributions of tone data in correspondence with an imaging surface;

FIGS. 11A and 11B are plan views showing matrix pattern distributions corresponding to the tone data distributions;

DESCRIPTION OF THE PREFERRED EMBODIMENT

Figure 5A:
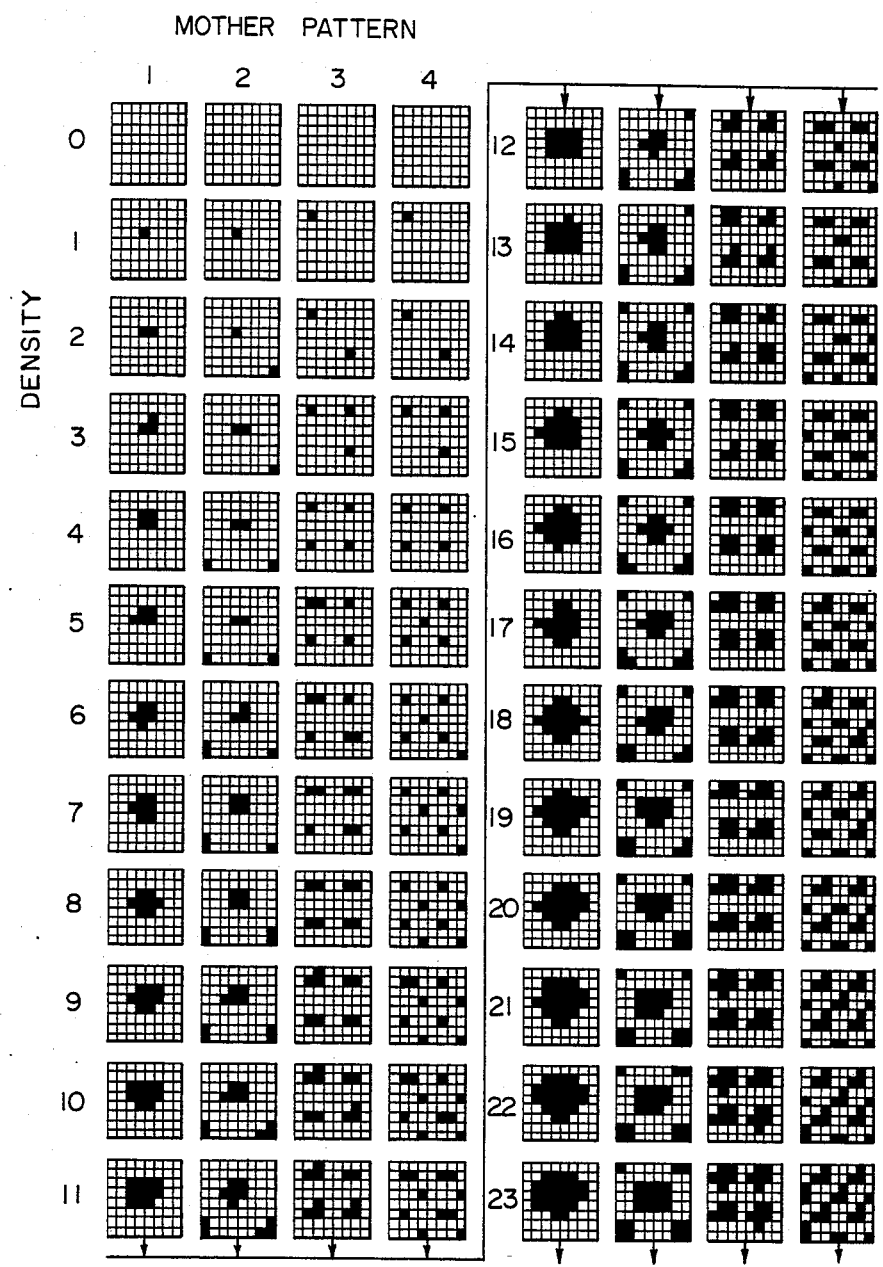
FIGS. 5A and 5B are plan views of mother matrix patterns in the groups 1-4.

While the halftone image processing method of the present invention is susceptible of numerous physical embodiments, depending upon the environment and requirements of use, a substantial number of the herein shown and described embodiment have been made, tested and used, and all have performed in an eminently satisfactory manner.

In an embodiment of the present invention hereinafter described, five groups of patterns having individual density characteristics are used, i.e., groups 1-5 employing the mother matrix patterns disclosed in the previously mentioned Japanese Patent Application No. 58-161692/1983 as their density characteristic patterns, and a group 5 employing as its density characteristic pattern the pattern disclosed in the Japanese Patent Application No. 58-138944/1983 which renders densties in terms of differences in the distribution of vertical and horizontal overlapping erasing points.

Description will first be made of a pattern construction and a procedure for extraction of an image pattern on the four groups which commonly use mother matrix patterns. A mother matrix mattern has an 8×8 bits (pixels) construction for rendering sixty-four different tones. For the diversity of tone representation, four different mother matrix patterns are utilized. The mother matrix patterns are provided by comparing source mother patterns (four kinds), each of which is provided with sixty-four threshold data, and tone data each designating a density No.

Referring to FIGS. 4A-4D, distribution of threshold data in the source mother patterns (threshold matrix patterns) are shown. Tone data (data representative of densities 0-63) are compared with threshold values of a source mother pattern by sequentially updating the threshold values, i.e., reading the threshold values in a horizontal direction in the drawing (hereinafter referred to as a main scan direction) and, after reading one row in the main scan direction, shifting the row to the next in a vertical direction (hereinafter referred to as a sub-scan direction). When tone data is larger than a threshold value, a logical ONE is written in an 8×8 bit matrix pattern memory; when it is smaller than the threshold value, then a logical ZERO. In this matter, logical values are written in those bits of the pattern memory which correspond to the positions of the respective threshold values. The resulting content of the pattern memory is the mother matrix pattern matching with the tone data.

To provide four groups of mother matrix patterns, four source mother patterns are prepared.

In a source mother pattern 1, small threshold values representative of low densities are positioned in a central area, and large threshold values representative of high densities in a peripheral area. Mother matrix patterns 1 derived from the source mother pattern 1 (image information patterns to be written in the pattern memory in correspondence with tone data) are shown in the leftmost (vertical) column of FIGS. 5A and 5B.

In a source mother pattern 2, threshold values representative of low densities are sequentially distributed from a central area toward four corners of the matrix. Mother matrix patterns 2 derived from the source mother pattern 2 are shown in the second column from the left in FIGS. 5A and 5B.

In a source mother pattern 3, threshold values representative low densities are positioned such that four points are distributed at substantially equal distances. The source mother pattern 3 provides mother matrix patterns 3 as shown in the third column from the left in FIGS. 5A and 5B.

In a source mother pattern 4, threshold values are distributed such that record (display) dots are scattered over the entire matrix. The source mother pattern 4, provides mother matrix patterns 4 as shown in the rightmost column in FIGS. 5A and 5B.

Next, assuming that a mother matrix pattern (one of those shown in FIGS. 5A and 5B) is to be generated in the pattern memory in response to group designation data (data specifying one, N, of the source mother patterns 1-4) as well as to tone data, description will be made of extraction of image data.

Where a mother matrix pattern is bisected, areas A and B shown in FIGS. 6A or 6B are the child matrix patterns. In the division shown in FIG. 6A, when tone representation mode data specifies N=1 and the tone data, "11", the left half data is extracted from the lowermost pattern in the leftmost column of FIG. 5A and then, if the next tone data spcifies "10", the right half data is extracted from the second pattern from the bottom in the leftmost column of FIG. 5. If the following tone data specifies "9", the left half data is extracted from the third pattern from the bottom in the leftmost column of FIG. 5A. If the subsequent tone data specifies "1", the right half data is extracted from the second pattern from the top in the leftmost column of FIG. 5A.

Figure 5B:
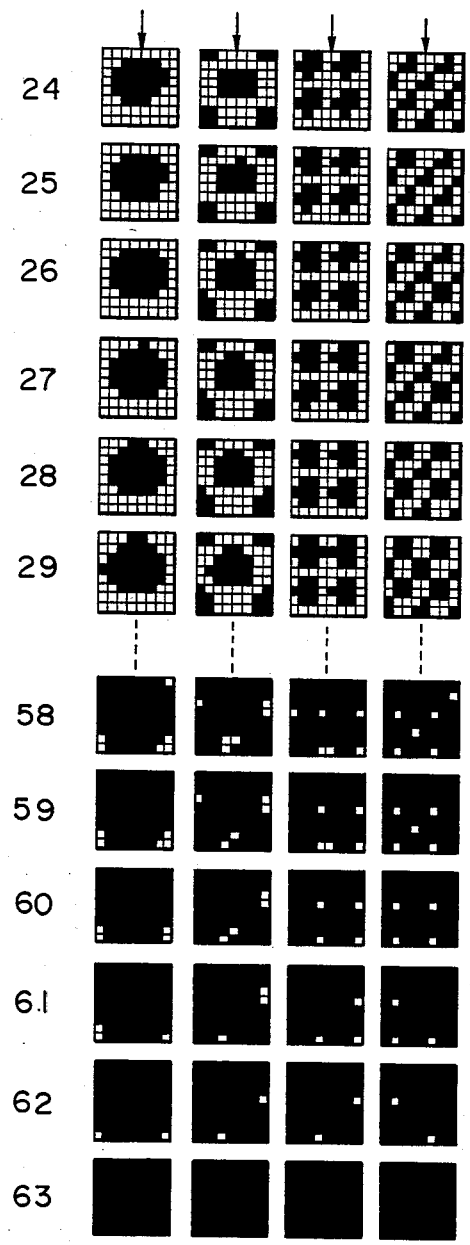

Meanwhile, in the division mode shown in FIG. 6B, when the tone representation mode data indicates N=1 and the tone data, "11", the upper half data is picked up out of the lowermost pattern in the leftmost column of FIG. 5A and, if the next tone data indicates "10", the upper half data out of the second pattern from the bottom in the leftmost column of FIG. 5A. If the next tone data indicates "9", the upper half data is extracted from the third pattern from the bottom in the leftmost column of FIG. 5A. If the next tone data indicates "1", the upper half data is extracted from the second pattern from the top in the leftmost column of FIG. 5A. In this manner, one row (odd row) of tone data in the main scan direction are converted to individual image information. In the next row (even row), if the tone data indicates "10", the lower half data is extracted from the second pattern from the bottom in the leftmost column of FIG. 5A. If the next tone data indicates "1", lower half data is extracted from the second pattern from the top in the leftmost row of FIG. 5A.

Referring to FIG. 6C, there is shown another example in which a mother matrix pattern is divided into four child matrices A–D. In this particular example, when the tone representation mode data specifies N=1 and the tone data, "11", the upper left one quarter is extracted from the lowermost pattern in the leftmost column of FIG. 5A (corresponding to A of FIG. 5C) and, if the next tone data specifies "10", the upper right one quarter out of the second pattern from the bottom in the leftmost column of FIG. 5A (corresponding to B of FIG. 6C). If the next tone data specifies "9", the upper left one quarter data is picked up out of the third pattern from the bottom in the leftmost column of FIG. 5A. If the next tone data specifies "1", the upper right one quarter data is extracted from the second pattern from the top in the leftmost row of FIG. 5A (corresponding to B of FIG. 6C). In this manner, the tone data in one row (odd row) are converted to individual image information. In the next row (even row), if the tone data indicates "10", the lower left one quarter data is extracted from the second pattern from the bottom in the leftmost row of FIG. 5A (corresponding to C of FIG. 6C). If the next tone data indicates "9", the lower right one quarter is extracted from the third pattern from the bottom in the leftmost column of FIG. 5A (corresponding to D of FIG. 6C). If the next tone data indicates "1", the lower left one quarter is picked up out of the second pattern from the top in the leftmost column of FIG. 5A (corresponding to C of FIG. 6C).

The above-described principle also applies to a case wherein a mother matrix pattern is divided into sixteen child matrix patterns A–P as shown in FIG. 6D, or even to a case wherein a mother matrix pattern is divided into sixty-four child matrix patterns A, B, C, ... as shown in FIG. 6E. That is, a mother matrix pattern is generated or specified in response to tone data and, then, image information is picked up associated with a child matrix pattern which corresponds to a position of the mother matrix pattern to which the tone data is allocated.

The child matrix pattern division and extraction of image information may be generalized as will be described.

Assume that a mother matrix pattern MMP is divided into m in the main scan direction and n in the subscan direction to provide m×n child matrix pattern $CMP_{11}$–$CMP_{mn}$, where the leading label of each suffix is indicative of a position of the child matrix pattern in the mother matrix pattern with respect to the main scan direction and the trailing lable, a position with respect to the subscan direction. Let such a mother matrix pattern be represented by $$MMP = \sum_{j}^{n} \sum_{i}^{m} CMP_{ij}$$

Further, assume that one mother matrix pattern of image information are provided by m×n tone data, $$\sum_{j}^{n} \sum_{i}^{m} ICD_{ij},$$

which are tone data $ICD_{11}$–$ICD_{mn}$. Then, information associated with a particular child matrix pattern $CMP_{ij}$ of the mother matrix pattern which is designated by tone data $IC_{ij}$ is provided as image information in a bit distribution associated with the tone data $ICD_{ij}$.

Assume a case wherein tone data are distributed as shown in FIG. 10A and the source mother pattern 1 and the quarter division mode are designated. Then the tone data are as follows:
$ICD_{11}=12$, $ICD_{21}=14$, $ICD_{11}=16$, $ICD_{21}=18$
$ICD_{12}=17$, $ICD_{22}=19$, $ICD_{12}=21$, $ICD_{22}=20$
$ICD_{11}=22$, $ICD_{21}=24$, $ICD_{11}=21$
$ICD_{11}=27$, $ICD_{22}=22$ Such causes image data to be reproduced as shown in FIG. 11A. That is, the following child matrix patterns are arranged in correspondence with the distribution of tone data:
$CMP_{11}$ of 12, $CMP_{21}$ of 14, $CMP_{11}$ of 16, $CMP_{21}$ of 18
$CMP_{12}$ of 17, $CMP_{22}$ of 19, $CMP_{12}$ of 20, $CMP_{22}$ of 20
$CMP_{11}$ of 22, $CMP_{21}$ of 24, $CMP_{11}$ of 21
$CMP_{11}$ of 27, $CMP_{22}$ of 22
where the numeral following each tone data represents particular one of the mother matrix patterns 1 which is associated with a density designated by the numeral.

Here, each square area enclosed by a line shows the size of a single mother matrix pattern. In FIG. 11A, each rectangular area enclosed by a thick line represents the size of one mother matrix pattern. An image pattern resulting from the reproduced image data of FIG. 11A is shown in FIG. 11A.

Assuming that tone data are distributed as shown in FIG. 10B and that image information is to be reproduced on a sixteen division mode (shown in FIG. 6D), then child matrix patterns are arranged as shown in FIG. 11B. Each rectangular area in FIG. 11B enclosed by a thick line represents the size of a mother matrix pattern. In FIG. 11A, each numeral designates one of the mother matrix patterns 4 which is assigned to a density designated by the numeral. The resulting reproduced images are shown in FIG. 11B.

Extraction of a child matrix pattern A of FIG. 10A and child matrix patterns A and C of FIG. 10C are performed by providing AND of a one-byte matrix pattern shown in FIG. 11A and one line of an object mother matrix pattern in the main scan direction. The AND is written in a page memory or a buffer memory. Such is repeated on eight consecutive lines. In the matrix pattern shown in FIG. 11A, a ONE (hatched in the drawing) is stored in a portion to be extracted and ZEROs in the other portions. That is, the matrix pattern of FIG. 11A represents the data which is indicative of F0H.

Concerning the child matrix pattern B of FIG. 10A and the child matrix patterns B and D of FIG. 10C, they are extracted by providing AND of one byte of matrix pattern shown in FIG. 11B and one line of data of the object mother matrix pattern in the main scan direction. Since ZEROs associated with the above-mentioned non-extracted portions have been stored in the page memory or the buffer memory, data in an object area of the page memory or the buffer memory is read out to provide OR of the read data and the AND obtained this time. The OR is stored in the page memory or the buffer memory updating the latter. This is repeated on eight consecutive lines. In the mask pattern of FIG. 11B, like that of FIG. 11A, a ONE is stored in a portion to be extracted and ZEROs in the others. The mask pattern of FIG. 11B is the data representative of OFH.

Likewise, in the extraction of pattern information in the child matrix pattern division mode shown in FIG. 10D, a mask pattern COH shown in FIG. 11B is used for the extraction of child matrix patterns A, E, I and M, a mask pattern 3OH for the extraction of B, F, J and N, a mask pattern OCH for the extraction of C, G, K and O, and a mask pattern O3H for the extraction of D, H, L and P. Data associated with the extracted A, E, I and M (AND) is directly written in the page memory or the buffer memory. Meanwhile, data associated with A, E, I and M, data associated with C, G, K and O, and data associated with D, H, L and P (each being AND) are written in the memory updating the latter after providing OR thereof and data previously stored in the memory.

The procedure described above also applies to the extraction of child matrix pattern information in the child pattern division mode shown in FIG. 10E.

In the above description, each mother matrix pattern is dimensioned one byte in the main scan direction and is treated in bytes, while all the child matrix patterns are the same in dimensions. The number of bits of the mother matrix patterns or that of the child matrix patterns in the subscan direction is open to choice because whether it is in bytes or not is insignificant from the data processing standpoint. However, so far as the main scan direction is concerned, it is preferable that both the mother and child matrix patterns be in bytes to promote high speed, byte-by-byte data processing.

For the above reason, in the illustrative embodiment, mask patterns are used so that even the child matrix patterns may be processed in bytes by the previously described logical processing. In accordance with the logical processing, the child matrix patterns constituting one mother matrix pattern do not have to be the same in size. Where a mother matrix pattern be in bytes, child matrix patterns can be readily processed in bytes as discussed above. Meanwhile, where both the mother matrix pattern and child matrix patterns comprise bits the numbers of which are fractions of one byte in the main scan direction, the processing falls in complication. In such a case, paying attention to the number of bits, a, of a child matrix pattern in the main scan direction and assuming that $a \times b = c$ bytes where b and c are minimum integers, one row of data in a child matrix pattern in the main scan direction is repeatedly written in c bytes b times and, then, AND of the result and a mask pattern which leaves only one necessary row of data in c bytes so as to write the AND data in the page memory or the buffer memory. So long as the child matrix pattern is the leftmost one, the AND data is directly written in the memory as described. If it is not the leftmost one, OR of the AND data and data stored in the memory is provided to write the result in the memory.

As described above, in accordance with the present invention, the use of large mother matrix patterns allows a substantial number of tones to be rendered. Also, since the mother matrix patterns can be readily constructed in bytes, data processing in bytes is facilitated. In addition, since child matrix patterns are allocated to tone data, a high resolution is attainable.

Figure 5C:
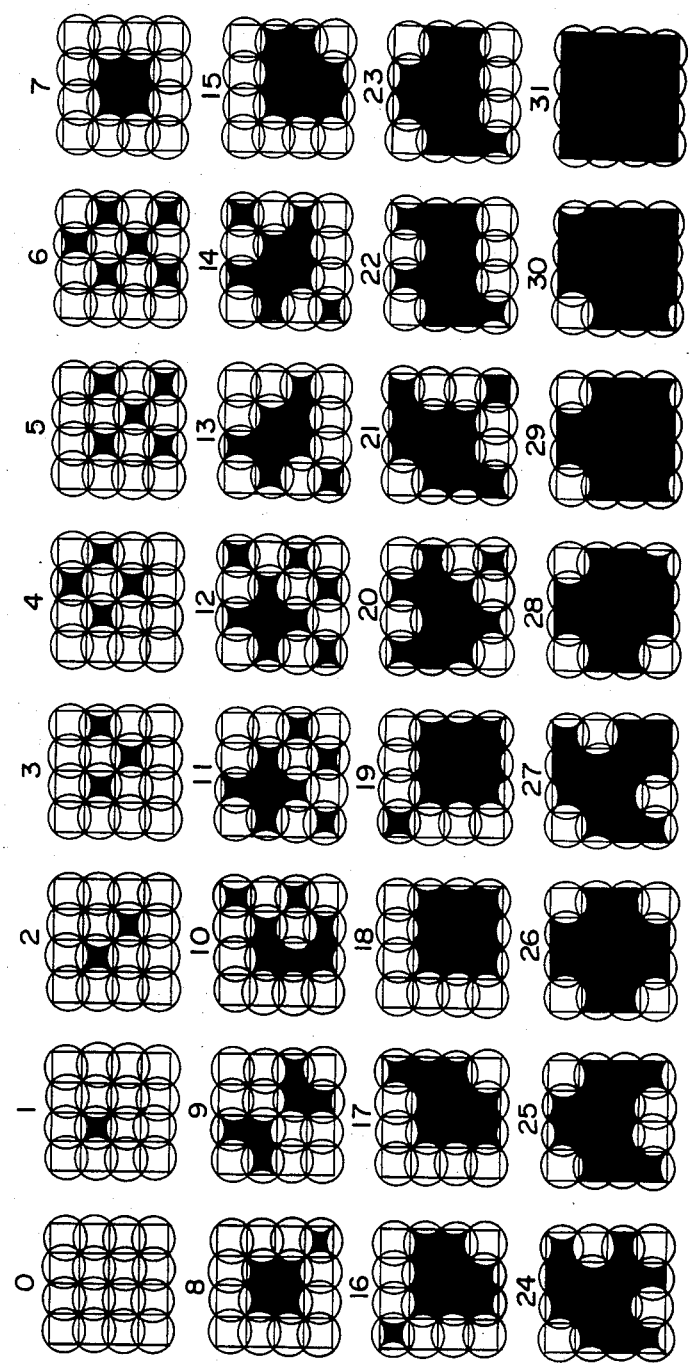
FIG. 5C is a plan view of matrix patterns in the group 5.

Hereinafter will be described a pattern construction and image pattern processing which are applied to the group 5, which represents density differences in terms of differences in the distribution of vertically and horizontally overlapped erasing points. As shown in FIG. 5C, the group 5 renders thirty-two tones by thirty-two matrix patterns each of which comprises $4 \times 4$ dots. The patterns shown in FIG. 5C represent recorded images. In this particular case, matrix pattern data are produced by writing ONEs in those bits which correspond to the pixels (square) smeared black in FIG. 5C and ZEROs in those bits which correspond to the blank pixels. In each of the matrix patterns of FIG. 5C, erasing dots represented by circles are assigned to the pixels with ZEROs. That is, the visible patterns shown in FIG. 5C are attainable by, for example, uniformly charging the surface of a photoconductive element, then removing the charge in dots represented by the circles, and then developing the remaining charged portions. Since it is impossible to assign threshold data to the thirty-two pattern data in contrast to the case of the source mother patterns, they are stored in storage means. As shown in FIG. 5C, the number of tones to be rendered is thirty-two and, hence, tone data associated with the group 5 are limited to those which indicate 0-31.

Figures 8, 8A:
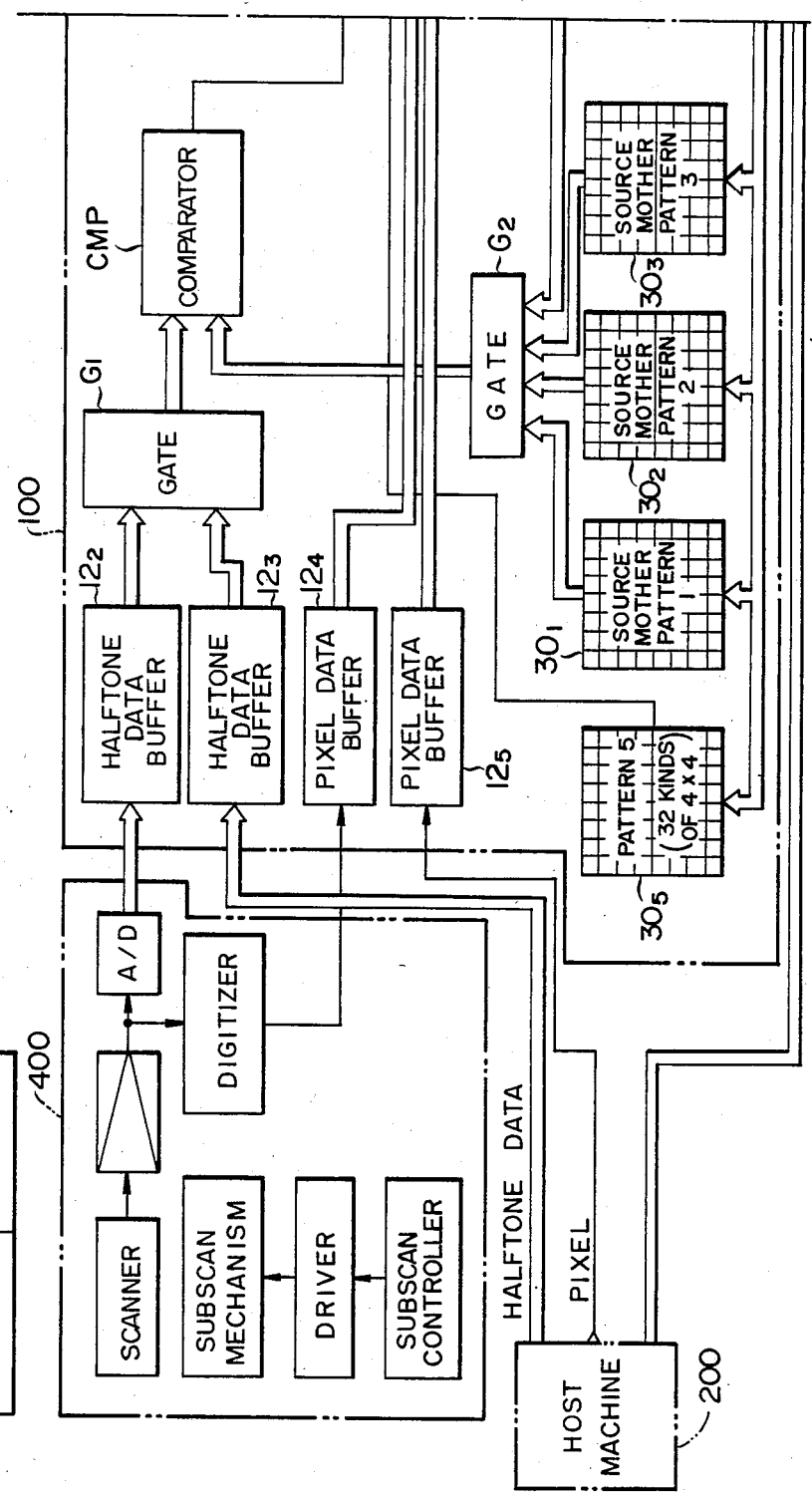

Referring to FIG. 8, an exemplary apparatus for practicing the method of the present invention is shown. The apparatus is constructed to serve as a halftone data processing apparatus 100 which is connected to an image reader 400 and a host machine 200 such as a computer or a facsimile transceiver (receiving halftone). As the image reader 400 or the host machine 200 applies group designation data, tone data and magnification data to the halftone data processing apparatus, or processor 100, the latter develops image information in bit (dot) distributions in a page memory 20. Although the processor 100 in practice comprises a computer unit and is not in the illustrated block construction, various elements inside the computer unit are shown as discrete hardware elements separated from a central control unit 10, which is the body of the computer.

First, the host machine 200 delivers to the processor 100 initial data which are a command indicative of whether or not rewriting matrix patterns is necessary and, if it is necessary, matrix pattern data or data indicative of addresses and contents associated with those portions which are to be rewritten. This is followed by delivery of group designation data, magnification data and tone data from the host machine 200 to the processor 100. The central control unit, or controller, 10 transfers matrix patterns stored in a read only memory (ROM) to a random access memory (RAM). At this instant, where any of the matrix patterns needs be rewritten as instructed by the host machine 200, the controller 10 rewrites a matrix pattern at an instructed tone level when read it out of the ROM and, then, stores the rewritten matrix pattern in the RAM. After storing all the matrix patterns in the RAM, the controller 10 specifies matrix patterns one by one in response to group designation data and tone data applied thereto from the host machine 200, thereby reading them out of the RAM.

The operation of the processor 100 will be described based on the construction shown in FIG. 8. The data processing operation assigned to the controller 10 is shown in FIGS. 9A and 9B.

Figures 1, 9A:
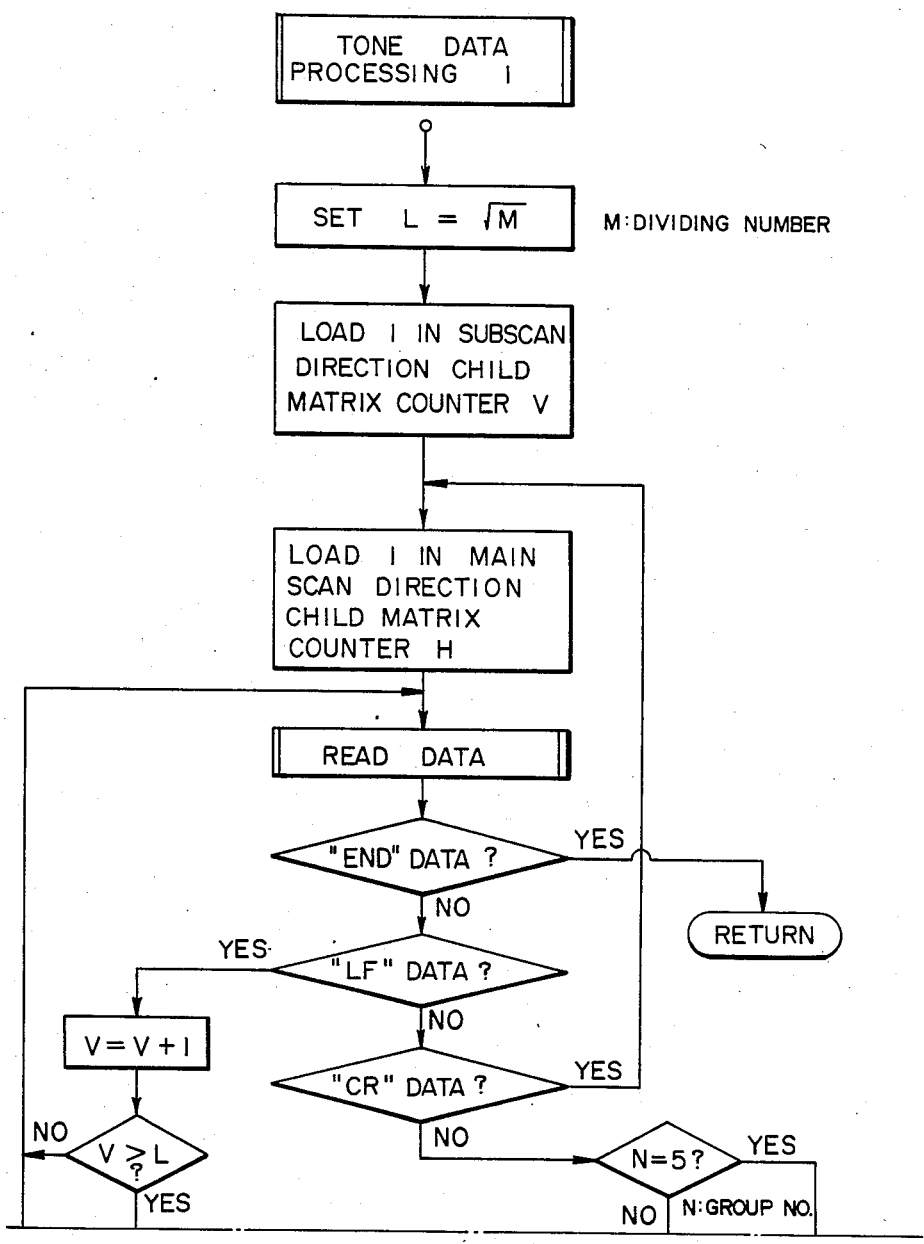
Figures 2, 9A:
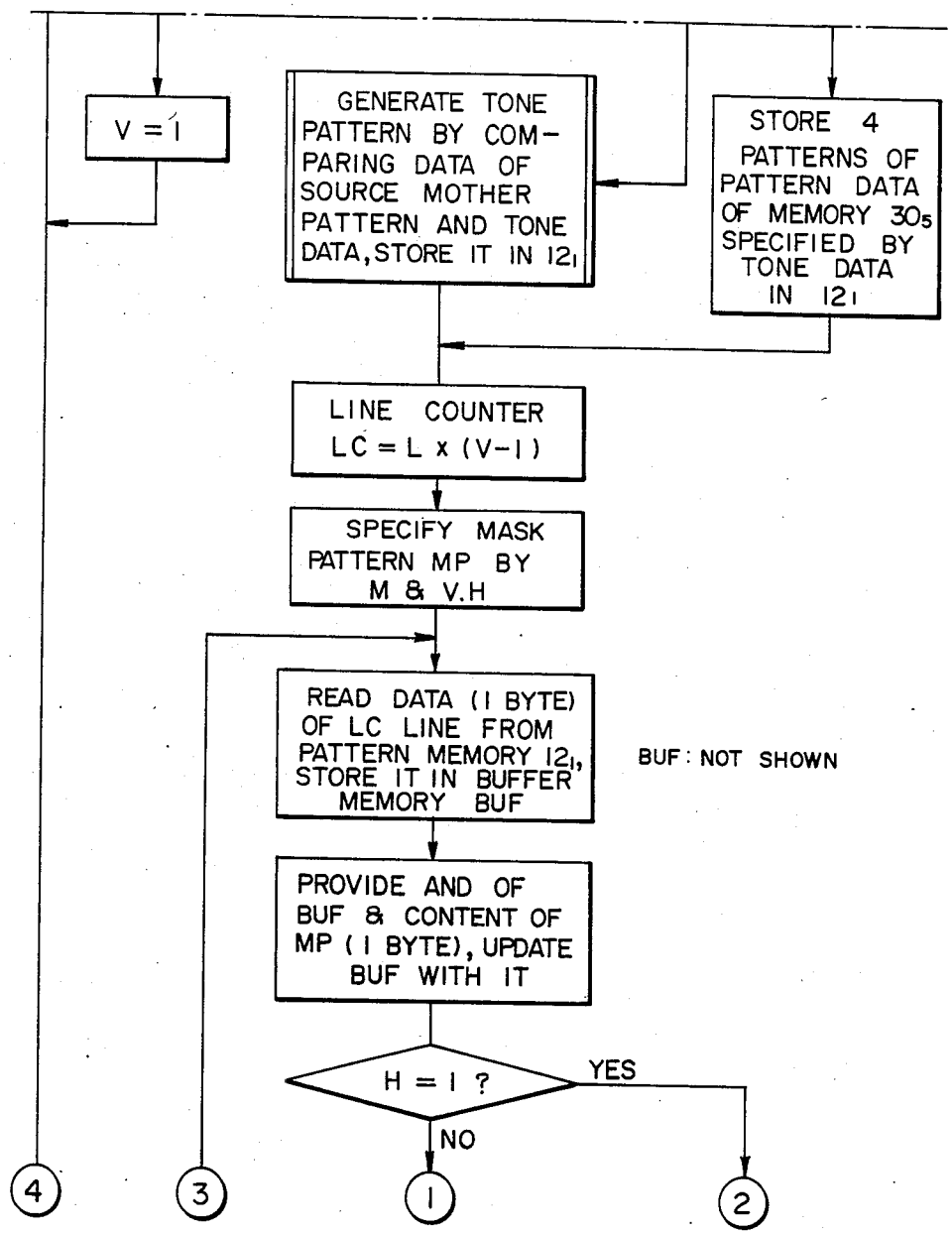
FIG. 2 is a plan view showing a relationship between an arrangement of many matrix patterns in the order of densities to be rendered and allocation of memory leading addresses and belonging groups.
FIG. 9A shows the connection between FIGS. 9A-1 and 9A-2.
Figure 9B:
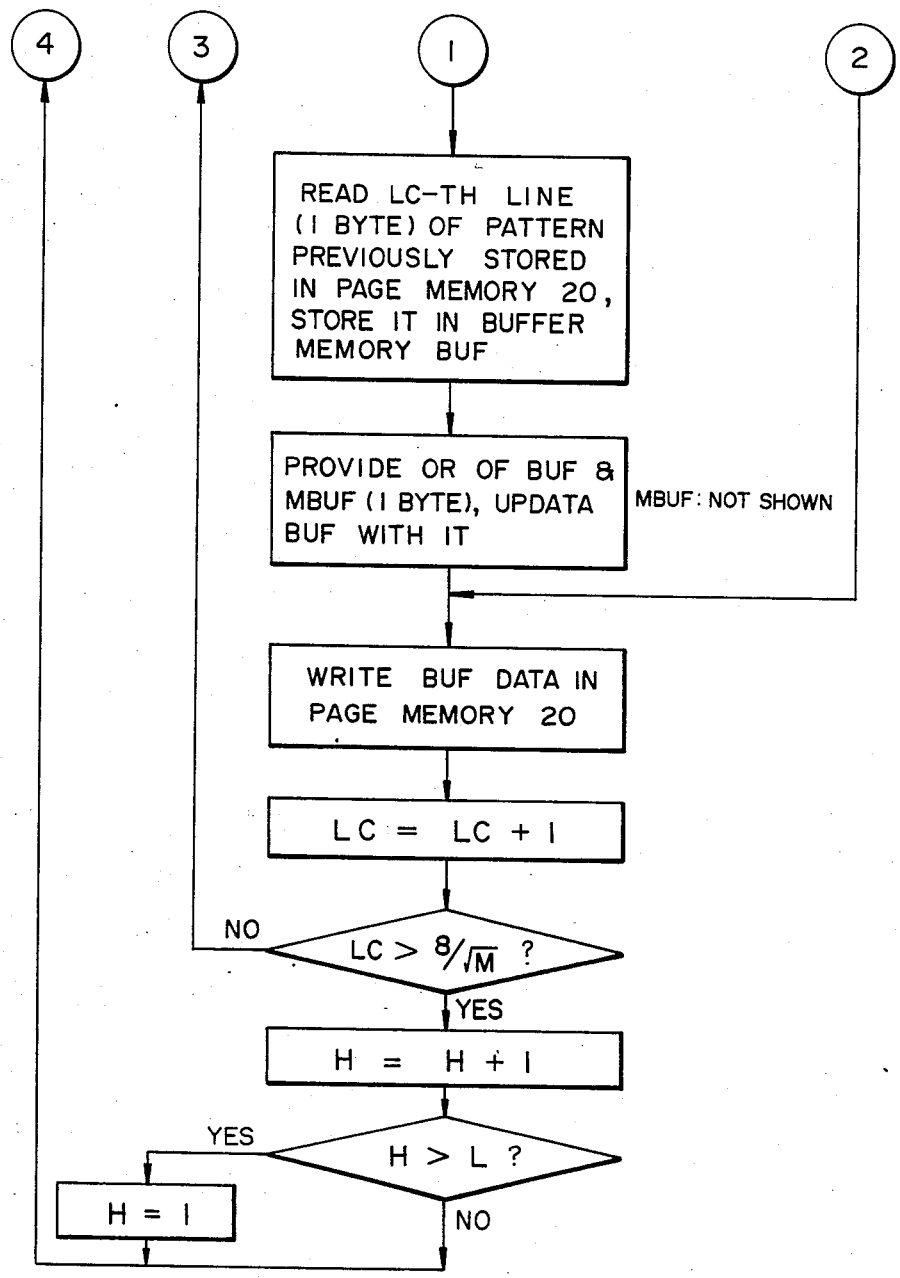
Figure 12B:
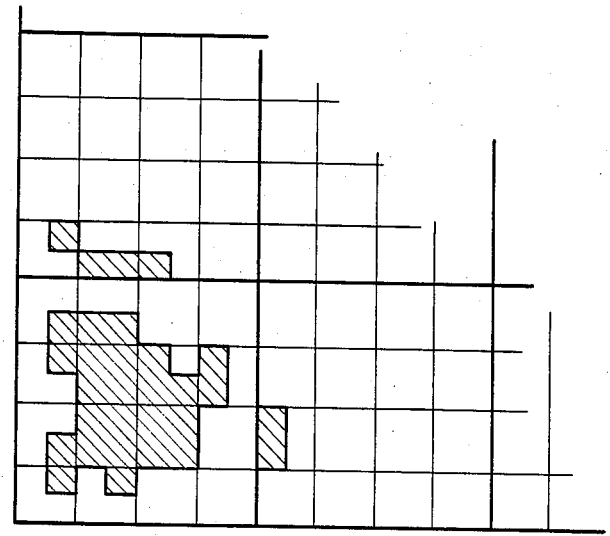
FIGS. 12A and 12B show in plan views image information in child matrix patterns developed in an imaging area, hatched portions indicating ONEs, or recording (display), and blank portions ZEROs, or non-recording.
Figure 12A:
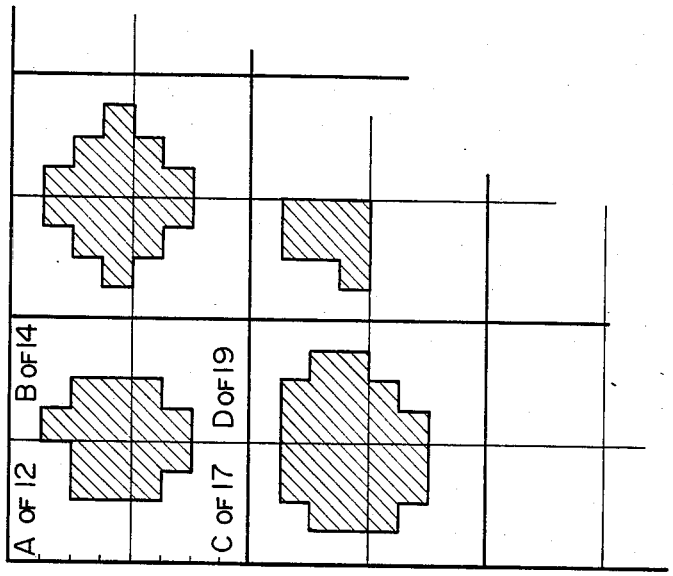
Figure 13:
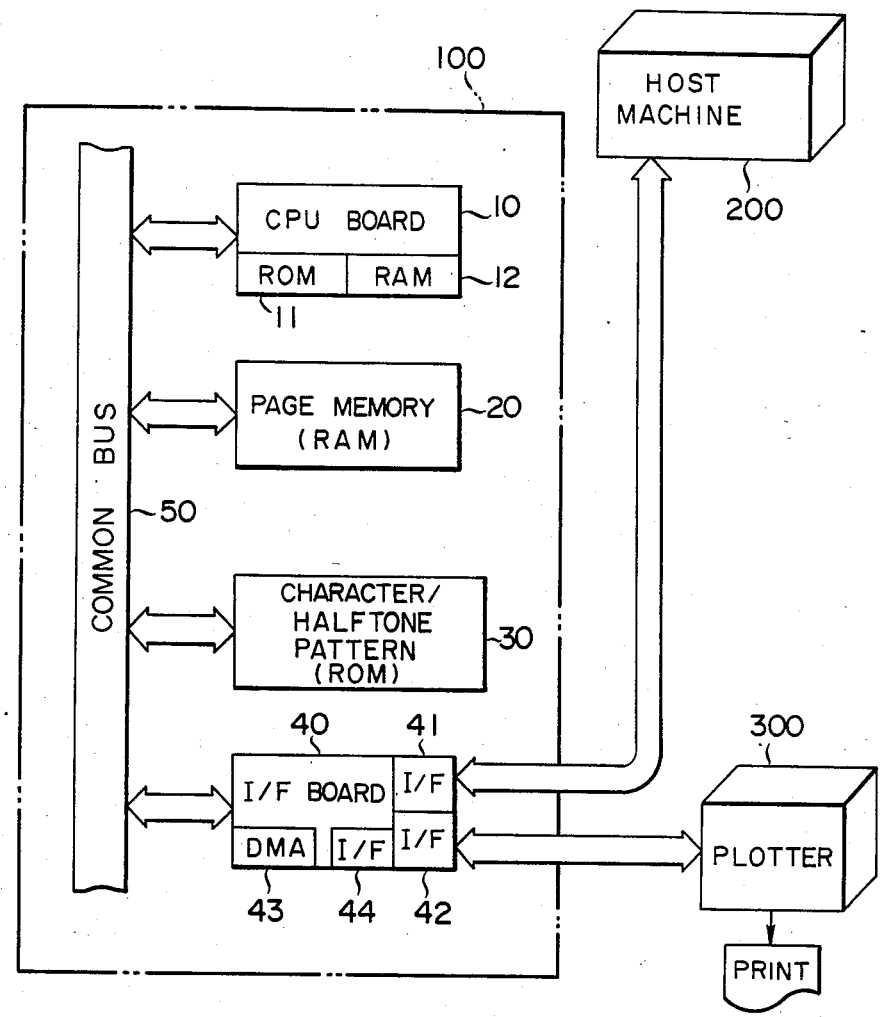
FIG. 13 is a block diagram of a specific construction of an apparatus for practicing the method of the present invention.

As shown in FIGS. 9A and 9B, when the controller 10 advances to a tone data processing routine for converting tone data applied thereto from the image reader 400 or the host machine 200 to image data, it reads the magnification data M (dividing number of a mother matrix pattern, i.e., number of child matrix patterns) and, then, stores in a register L the dividing numbers in the main scan and subscan directions, i.e. $\sqrt{M}$. In this example, M is limited to one of "4 (FIG. 6C)", "16 (FIG. 6D)" and "64 (FIG. 6E)".

Then, the controller 10 loads "1" in a counter V adapted to see a position (j) of a matrix pattern to be processed with respect to the subscan direction (j=1), while loading "1" in a counter H adapted to see a position (i) of the same with respect to the main scan direction (i=1) and, thereafter, reads data output from the image reader 400 or the host machine 200. If the input data is tone data, the controller 10 references the group designation data and, if it designates the group 5, connects a selection gate $G_4$ to a memory $30_5$. In this condition, the controller 10 reads out particular one of thirty-two patterns in the group 5 stored in the memory $30_5$ which is specified by the tone data and, then, writes it four consecutive times in a memory $12_1$, that is, four identical patterns in an 8×8 bits area of the memory $12_1$. This is to turn the pattern in the group 5 to an 8×8 dot construction, instead of the original 4×4 dot construction, to match it with the 8×8 dot construction of the patterns in the groups 1-4. The four times of repeated writing allows the succeeding data processing to be performed employing the same logic as the groups 1-4. In the following description, it should be noted that four patterns of pattern data in the group 5 stored in the memory $12_1$ are included in the expression "mother matrix pattern", and that one of the four patterns, i.e., a 4×4 dots matrix pattern specified by the tone data is included in the expression "child matrix pattern".

When any one of the groups 1-4 is designated, the controller 10 generates a mother matrix pattern. First, the controller 10 connects the selection gate $G_4$ to a comparator CMP to apply tone data ICDij to the comparator CMP via a gate $G_1$ and, at the same time, respective threshold data in a source mother pattern N (N=1~4) designated by pattern data N to the comparator CMP via a gate $G_2$ in a predetermined sequence. When the output of the comparator CMP is a ONE which shows that the tone data ICDij is larger than threshold data, a ONE is written in one bit in the pattern memory $12_1$ which corresponds in position to a store position (threshold read address) in the source pattern N where the threshold data is stored. When the comparator output is a ZERO, a ZERO is written in the same manner. As a result, a mother matrix pattern associated with the tone data ICDij is generated in the pattern memory $12_1$.

Next, the controller 10 loads a line counter LC with a product of a content of the register L and a value produced by subtracting 1 (one) from the content of the counter V. The controller 10 then specifies a mask pattern depending upon the magnification data M and contents of the counters V and H. That is, referencing to the number of division M and the contents of the counters V and H, the controller 10 specifies a child matrix pattern CMPij (i representing the content of the counter H, j the content of the counter V, and M the number of division indicative of a particular division mode shown in any of FIGS. 6C-6E) and, then, a matrix pattern (e.g. FIGS. 6A or 6B) to be assigned to the specified child matrix pattern.

Under the condition described above, the controller 10 reads one byte of data in a line (in the main scan direction) designated by the content of the line counter LC out of the pattern memory $12_1$, storing the read data in a buffer memory BUF (not shown). The data stored in the buffer memory BUF and the mask pattern data are applied to the AND gate $G_1$ the output of which is stored in the buffer memory (BUF) updating the latter. Then, the controller 10 references the content of the counter H. If the content of the counter H is "1", indicating that the matrix pattern from which information is to be picked up is the leftmost one in the mother matrix pattern, the controller 10 transfers the data directly from the buffer memory (BUF) to the page memory 20. If it is not "1" showing that the data of the leftmost child matrix pattern has already been written in the page memory 20 and, thereby, ZEROs of the mask pattern in the other child matrix pattern writing portions, the controller 10 reads the LC-th line (LC being the content of the counter LC) (one byte) of the previously written pattern data, stores it in a buffer memory MBUF, applies the data in the MBUF and that in the buffer memory BUF to an OR gate $LG_2$ to provide their OR, updates the buffer memory BUF with the resulting OR data, and updates the page memory 20 with the data stored in the buffer memory BUF.

Thereafter, the controller 10 increments the line counter LC by 1 (one) and, then, compares a content of the line counter LC and a number of lines of the child matrix pattern $8/\sqrt{M}$. If the content of the line counter LC is short of the number of lines $8/\sqrt{M}$, the operation is transferred to the extraction of image in the next line (3); if not, the counter H is incremented by 1 and the resulting content is compared with the content of the register L. If the content of the counter H is larger than that of the register, it is seen that image extraction has been completed on the child matrix pattern located in the leftmost position in the mother matrix pattern with respect to the main scan direction. Then, in order to perform the next processing on the leftmost child matrix pattern, the controller 10 loads "1" in the counter H and advances to the next data reading operation.

Where the data read by the data reading indicates completion of halftone processing, the controller 10 returns to the main routine. When the data is Line Feed "LF", the controller 10 increments the counter V by 1 and compares the resulting count with the content of the register L. If the former is larger than the latter, meaning that image processing has been completed on one whole mother matrix pattern, the controller 10 loads "1" in the counter V and, thereupon, returns to data reading. When the data is Carriage Return (CR), meaning that image processing has been completed over the width of one mother matrix pattern in the main scan direction, the controller 10 loads "1" in the counter H and, then, advances to data reading.

In the construction of FIG. 8 which has been referred to in the above description, the buffer memories $12_1$-$12_3$ are in practice implemented by internal RAMs or ROMs of a computer, the page memory 20 is implemented by an external RAM, and the memories $30_1$-$30_5$ temporarily storing the original mother patterns 1-4 are implemented by internal RAMs of a computer or external RAMs. In this example, the original mother matrix patterns shown in FIGS. 4A-4D and the matrix patterns shown in FIG. 5C are stored in internal ROMs of a computer or external ROMs. The gates $G_1$-$G_4$, $LG_1$ and $LG_2$ each are associated with functions which are performed inside a computer.

While the description has concentrated to a mode wherein mother matrix patterns are generated by use of source mother patterns 1-4 each having threshold values, the mother matrix patterns (FIGS. 5A and 5B) may be stored in advance in ROMs or RAMs so as to select one of them in response to group designation data N and input tone data, in which case an extra storage capacity is required for storing the mother matrix patterns.

Although the groups 1-4 have been employed as mother matrix patterns, the group 4, for example, may comprise the matrix pattern disclosed in the previously cited Japanese Patent Application No. 58-132187/1983.

In any case, the gist is that one of matrix patterns belonging to one of several groups each of which is different in tone representation mode from the others and made up of matrix patterns larger in number than dots of one matrix pattern is specified in response to group designation and tone data.

In summary, it will be seen that the present invention provides a halftone image processing method which allows tones to be represented in any of various modes due to the use of several different kinds of matrix pattern groups which have individual modes of tone representation. In addition, because each of the groups comprises matrix patterns larger in number than dots which constitute a matrix pattern, the method of the present invention offers numerous different tones to be rendered and, thereby, promotes representation of gradation with unprecedented smoothness.

Various modifications will become possible for those skilled in the art after receiving the teachings of the present disclosure without departing from the scope thereof.

What is claimed is:

1. A half-tone image processing method for providing image information in a bit distribution, comprising the steps of:
supplying tone data indicative of a recording density;
establishing a plurality of matrix pattern groups, each group having a plurality of matrix patterns with one matrix pattern for each tone level; the matrix patterns of the same tone level in different groups having the same number of image pixels, but with the pixels being arranged differently in the matrix;
selecting a matrix pattern group from said plurality of matrix pattern groups;
specifying one matrix pattern from said selected matrix pattern group by group designation data and tone data;
whereby information in the specified matrix pattern is provided as bit distribution image information associated with the tone data.

2. The improvement as claimed in claim 1, wherein the matrix pattern specified by the group designation data and the tone data is equal in size to a bit distribution image information pattern which is allocated to the tone data to be extracted.

3. The improvement as claimed in claim 1, wherein a bit distribution image information pattern allocated to tone data to be extracted is part of a matrix pattern which is to be specified by group designation data and the tone data.

4. The improvement as claimed in claim 1, wherein the matrix patterns are rewritable in response to a command output from a host machine.

5. The improvement as claimed in claim 1, wherein the group is designated by a host machine.

6. The improvement as claimed in claim 2, wherein the group is designated by a host machine.

7. The improvement as claimed in claim 3, wherein the group is designated by a host machine.

8. The improvement as claimed in claim 4, wherein the group is designated by a host machine.

9. In a recording apparatus which provides a recording density corresponding to a density of an input pixel by varying a number of dots per unit area, a tone recording apparatus is constructed to prepare unit area patterns, including a plurality of groups of patterns with each group including a plurality of patterns equal in number to the number of tone levels, the patterns having the same tone level in different groups having the same number of image pixels but with the pixels being arranged differently in the matrix and, after converting a density of an input pixel by a desired conversion rule, select and record a particular one of the unit area patterns which corresponds to the density converted, the unit area pattern being made up of pixels the number of which is less than the number of tones of input pixels, the density level to be recorded being set up based on the number of and positional relationship between dots which are distributed.

10. In claim 9, the unit area pattern is made up of pixels the number of which is greater than the number of tones of input pixels, an area pattern to be recorded in correspondence with one input pixel being a part of the unit area pattern.

11. In claim 9, the unit area pattern can be rewritten by downloading from a host.

12. In claim 9, a plurality of different kinds of unit area groups are provided and a particular one of the unit area groups to be recorded can be specified in response to an input pixel.

13. In a recording apparatus which provides a recording density corresponding to a density of an input pixel by varying a number of dots per unit area, a tone recording apparatus is constructed to prepare unit area patterns, including a plurality of groups of patterns with each group including a plurality of patterns equal in number to the number of tone levels, the patterns having the same tone level in different groups having the same number of image pixels but with the pixels being arranged differently in the matrix and, after converting a density of an input pixel by a desired conversion rule, select and record a particular one of the unit area patterns which corresponds to the density converted, the unit area pattern being made up of pixels the number of which is less than the number of tones of input pixels, the density level to be recorded being set up based on the number of and positional relationship between dots which are distributed, the unit area pattern being made up of pixels the number of which is greater than the number of tones of input pixels, an area pattern to be recorded in correspondence with one input pixel being a part of the unit area pattern.

14. In claim 13, the unit area pattern can be rewritten by downloading from a host.

15. In claim 13, a plurality of different kinds of unit area groups are provided and a particular one of the unit area groups to be recorded can be specified in response to an input pixel.

* * * * *